(No Model.)
F. KIRCHER.
ROTARY BLADE CUTTING MACHINE.
No. 480,387. Patented Aug. 9, 1892.
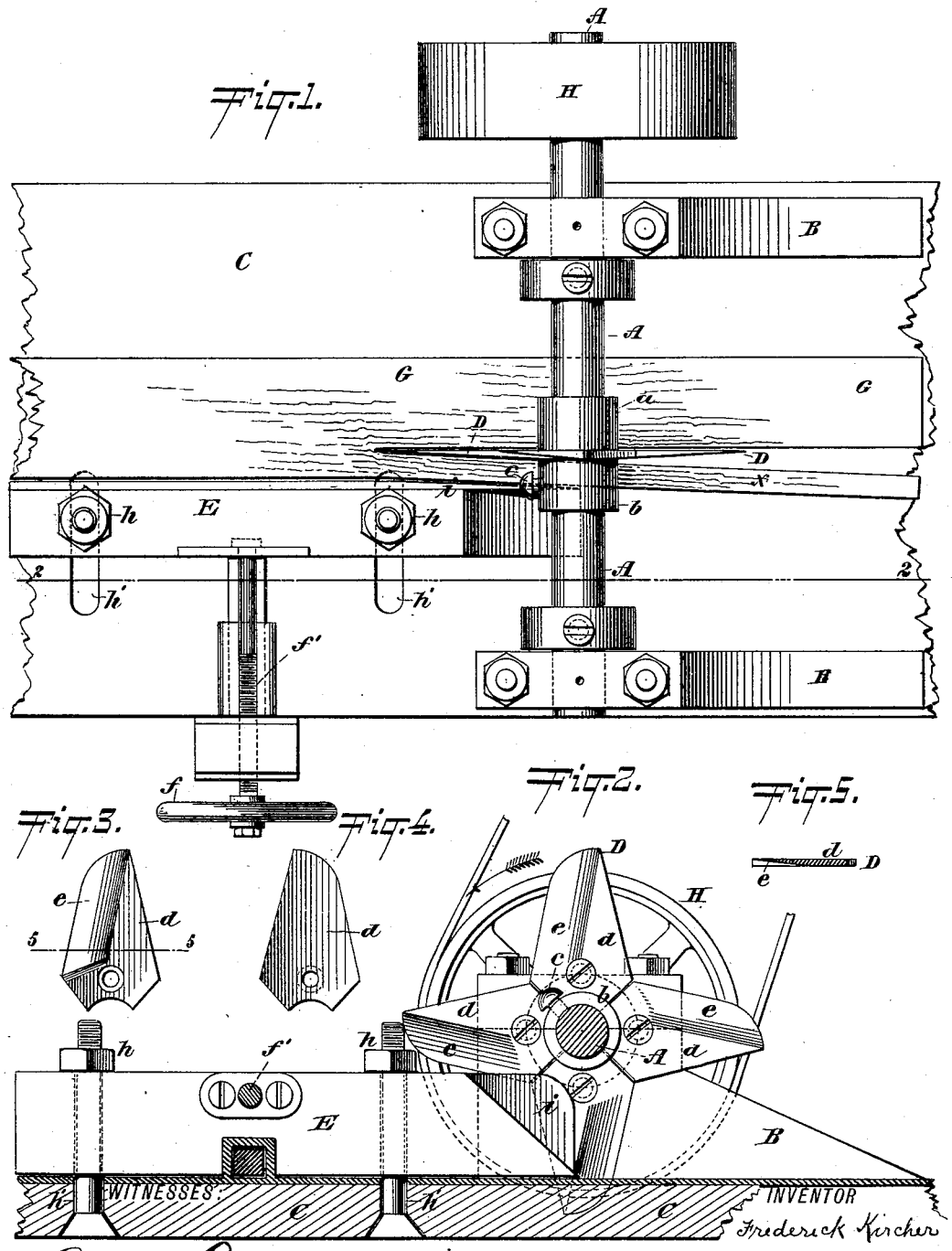

UNITED STATES PATENT OFFICE.

FREDERICK KIRCHER, OF NEW YORK, N. Y., ASSIGNOR OF ONE-HALF TO LUDWIG GLOECKNER, OF SAME PLACE.

ROTARY-BLADE CUTTING-MACHINE.

SPECIFICATION forming part of Letters Patent No. 480,387, dated August 9, 1892.

Application filed October 5, 1891. Serial No. 407,762. (No model.)

*To all whom it may concern:*

Be it known that I, FREDERICK KIRCHER, a resident of the city, county, and State of New York, have invented a new and useful Improvement in Rotary-Blade Cutting-Machines, of which the following is a specification.

My invention relates to an improvement in rotary-blade cutting-machines, and has for its object the cutting of lumber by means of a rotary cutter composed of knife-blades in place of sawing the same by an ordinary circular saw. It consists in the details of construction and combination of parts hereinafter described and claimed.

In the drawings, Figure 1 is a plan view of the machine; Fig. 2, a longitudinal section on line 2 2, Fig. 1. Figs. 3 and 4 are respectively front and rear views of one of the cutting-blades, and Fig. 5 a cross-section on the line 5 5 of Fig. 3.

A is a shaft mounted in suitable bearings B B on a frame or table C.

D is the rotary cutter, mounted on said shaft A between suitable collars $a$ $b$, one of which may be movable and keyed, as at $c$, to the shaft. This rotary cutter D may be made in a single piece or formed of several separate cutting-blades $d\, d$, held in position by attaching them with screws or otherwise to the shaft A, as shown in Fig. 2. The blades are beveled upon one side $e$, substantially as shown in the drawings. At the beveled side $e$ of this rotary cutter is placed an adjustable gage or guide-piece E, extending, by preference, beneath the shaft A. This gage is attached by the bolts $h$, working in slots $h'$, to the frame C, and is thus adjustable toward or from the blades of the cutter D. That part of the gage E which is nearest the cutter has the side $i$, which faces the cutter-blade substantially parallel to the bevel thereof. This is shown in Fig. 1. The adjustment of the gage to the cutter may be accomplished as shown in the drawings—to wit, by means of the hand-wheel $f$ and screw-shaft $f'$—or by other well-known means. Power is communicated to the shaft A and to the cutter by means of a belt and pulley H or otherwise.

In operation the gage is first set so that a required width of lumber may be cut off. The log or board is then advanced along the gage until it gets beneath the blades of the cutter. The piece or board $x$ taken off is bent aside between the bevel of the cutter and the parallel face of the gage, so as to thus allow the blades to proceed in the act of cutting without binding. This is very essential in a machine using a knife instead of a saw and operating without the wasteful production of sawdust.

The arrangement and construction of the gage and of the shaft carrying the rotary cutter shown in the drawings may be varied without departing from the spirit of my invention, the essential feature of which is the employment of a cutting-blade beveled on one side in conjunction with a gage having its operative face parallel to the bevel of the nearest blade.

What I claim, and desire to secure by Letters Patent, is—

The combination of the rotary cutter D, mounted upon a shaft A and having one or more beveled knife-blades $d$, with the gage E facing the bevel of the blade and having that portion which is nearest the blade parallel with the bevel thereof, substantially as and for the purpose described.

FREDERICK KIRCHER.

Witnesses:
HARRY M. TURK,
HENRY E. EVERDING.